May 3, 1932.  J. W. BRYCE  1,856,410
SCALE BEARING
Filed Feb. 16, 1928
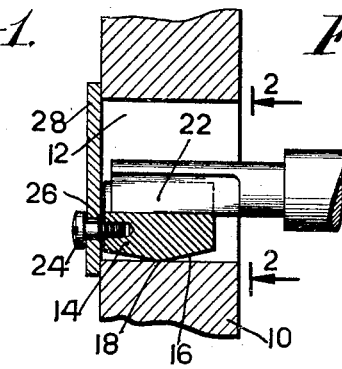
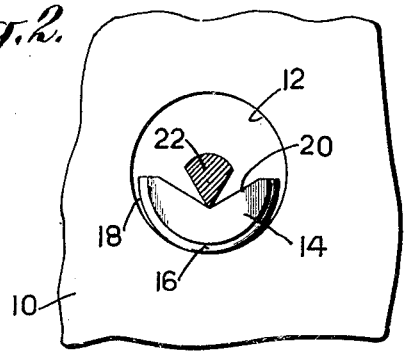
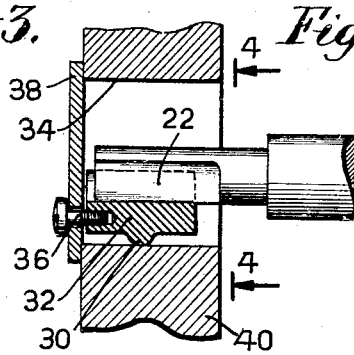
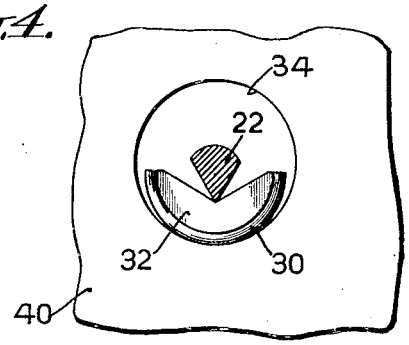
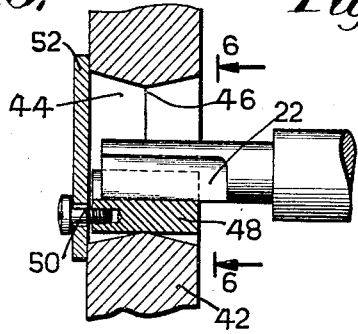
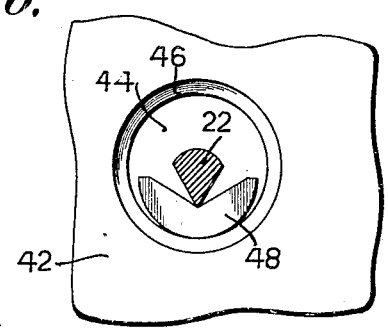
Inventor
JAMES W. BRYCE
By his Attorney Patented May 3, 1932

1,856,410

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

SCALE BEARING

Application filed February 16, 1928. Serial No. 254,797.

This invention relates to improvements in details of a weighing scale and more particularly to improvements in pivot bearings.

It is necessary to accuracy in scales that the knife edge pivots and their bearings seats be in absolute alinement. When a pivot and bearing seat are out of alinement, only a part of the pivot edge engages the bearing seat and this part is subject to excessive wear so that the knife edge rapidly loses the sharp edge required to maintain the predetermined lever arm ratios of the scale. Further, failure of the knife edge to seat properly in the bearing results in binding of the pivot with consequent inaccuracies. Since, as a rule, the bearings are rigidly mounted in one part and the pivots in another part, it is practically impossible to secure absolute alinement of the knife edges of the pivots and the apex lines of the bearing grooves. Even should absolute alinement be obtained upon assembling, the alinement may be destroyed in the subsequent use of the scale, due to rough handling or warping of parts.

The object of the present invention is to provide an improved knife edge bearing of the self-alining type, which will maintain absolute alinement of the knife edge and bearing seat under all conditions.

Other objects and advantages will be further disclosed in the following parts of the specification and in the accompanying drawings wherein is shown various forms in which the invention may be embodied.

In the drawings:

Fig. 1 is a longitudinal section through the center of one form of bearing embodying the invention;

Fig. 2 is a section on line 2—2 of Fig. 1;

Fig. 3 is a longitudinal section through another form of my invention;

Fig. 4 is a section on line 4—4 of Fig. 3;

Fig. 5 is a longitudinal section through still another embodiment of my invention;

Fig. 6 is a section on line 6—6 of Fig. 5.

Referring to Figs. 1 and 2, 10 indicates a portion of the frame provided with a circular aperture 12 in which is mounted a bearing piece 14. The bearing piece is formed as a segment of a double frusto-conical solid, the curved sides 16 of which converge at equal angles towards a common base 18 midway of the end bases of the bearing. The arc on which the base 18 is formed has a slightly smaller radius of curvature than the aperture 12 of the frame. Hence, the bearing piece and the bottom of the aperture 12 contact each other at substantially a single point of the base 18. The bearing piece has cut therein a longitudinally extending V-shaped groove 20, the apex of which crosses a line bisecting the bearing laterally. The knife edge 22 seats in the V-shaped groove in contact with the apex thereof. It is apparent from the aforesaid description that the bearing piece 14 may pivot in any direction on the point contact of the base 18 with the bottom of the frame aperture 12. In any position of the bearing, however, the apex line of groove 20 will be directly above the point of contact of the bearing and the bottom of aperture 12 so that the weight of the knife edge and connected parts will tend to stabilize the bearing. The outer base of the bearing piece has an opening in which is threaded a screw 24 passing loosely through a hole 26 in a plate 28 fixed to the frame 10 (by means not shown). The hole 26 is made large enough not to interfere with the movement of screw 24 when the latter shifts with bearing 14, the alining movement of the bearing being in no case of such extent as to cause the sides of the screw to contact with the hole 26. The head of the screw, however, prevents the bearing piece from falling out of aperture 12 when the scale is turned on its side or when the bearing is used in a vertical position with the knife edge extending vertically in the bearing groove.

In Figs. 3 and 4 is shown an embodiment of the invention which differs from the previously described embodiment in the means for providing the point contact between the bottom of the bearing piece and the aperture. In this embodiment, the bottom bearing surface is formed on the arc of a circle with a semi-circular bead 30 projecting therefrom midway of the sides of the bearing 32. The bead is formed on the arc of a circle of slightly smaller radius than the radius of circular aperture 34 so that there is a substantially one point contact between the bead and the aperture. As in the previously described embodiment and for the same purpose, the bearing is provided with a screw 36 which passes loosely through a hole in the plate 38 fixed to the frame 40. The embodiment shown in Figs. 3 and 4 provides one point contact with the same self-alining feature but is more easily machined.

In Figs. 5 and 6 is shown still another self-alining bearing with a different means for providing the one point contact between the bottom of the bearing piece and the socket in which it is seated. In this embodiment, the frame portion 42 is provided with an aperture 44 of double frustro-conical shape with the common base 46 midway of the sides of the frame and the sides of the conical surfaces diverging from said base. The bottom of the bearing piece 48 is in this case formed along its entire length on the arc of a circle of slightly smaller radius than that of the base 46, thus providing a substantially one point contact between the bottom of the bearing and the aperture as in the other embodiments previously described. The bearing piece is also provided with a screw 50 passing loosely through a hole in a plate 52 fixed to the frame piece 42 for the same purpose as in the other embodiments described above.

In each of the described forms of the invention, upon the placing of the knife edge in the V-shaped groove of the bearing pieces, the latter will shift on its one point contact with the frame to aline the apex of the groove with the knife edge. This alinement will be held so long as the scale is in use since any warping of the frame which tends to throw the bearing out of alinement will be compensated for by shifting of the bearing piece.

While the preferred forms of the invention have been shown and described, it is obvious that other and mechanically equivalent modifications may be devised which will embody the principles of the herein described invention. Accordingly, applicant desires to be limited only by the scope of the following claims:

1. In a device of the class described, a self alining bearing for a scale comprising a bearing member having a V-shaped groove for supporting a knife edge and provided with a convex surface, a member having a concave laterally sloping surface on the top of which the aforesaid convex surface is pivotally supported, and means for limiting lateral movement of the bearing member.

2. In a weighing scale, in combination, a bearing member having a V-shaped groove adapted to support a knife edge and a frame member having a surface on which an outer surface of said bearing member rests, one of said surfaces being double frustro-conical in shape and engaging the other surface only along the intersection between the cone surfaces to permit universal shifting between said members.

3. A self alining bearing for a weighing scale, comprising a bearing member provided with a V-shaped groove on the apex of which a knife edge is supported, said bearing member having an arcuately shaped portion and a frame member provided with an arcuately shaped surface of larger radius on which surface said bearing member portion rests.

4. A self alining bearing for a weighing scale, comprising a bearing member provided with a V-shaped groove, the apex of which is adapted to support a knife edge, and a frame member having a curved portion on which a portion of said bearing member contacts, the apex of said groove intersecting a line extending from the center of curvature of said curved portion to the points of contact of said frame and bearing member portions, and means for preventing shifting of said point of contact.

5. A self alining bearing for a weighing scale comprising a bearing member having a V-shaped groove, the apex of which is adapted to support a knife edge, and a frame member having an aperture with a concave surface on which said bearing member seats, said bearing member being provided with a frustro-conically shaped portion resting on the bottom of said aperture, and means for preventing said bearing member from leaving said aperture.

6. A self alining bearing for a scale, comprising a bearing member having an outer conical surface and a V-shaped groove thereabove, the apex of which is adapted to support a knife edge, and a frame member having a circular aperture of greater radius than the radius of the larger base portion of said conical surface, said bearing member being provided with a removable screw, and an element fixed to the frame and provided with an aperture through which said screw passes.

7. In a scale, a self-aligning bearing comprising a bearing element having a V-shaped groove for supporting a knife edge, a member having a concave surface on which the bearing member is supported, said members contacting each other at a single point to permit of a universal shifting movement of said bearing element on said point, and a member removably carried by said bearing element and engaging said supporting member to prevent shifting of said point of contact longitudinally of said V-shaped groove in one direction.

8. In a scale, a self-aligning bearing comprising a bearing element having a V-shaped groove for supporting a knife edge, a member having a cylindrical aperture for receiving and supporting said element, said element having a conical surface the base of which contacts the bottom of said aperture, and a member removably fixed to said element and extending outside of said aperture to prevent movement of said element longitudinally of the aperture in one direction.

9. A self-aligning bearing for a scale lever knife edge, comprising a bearing element having a V-shaped open groove to support said knife edge, a member having a cylindrical aperture to receive and support said element, the latter having a conically shaped surface the base of which contacts the aperture walls, said base being formed on a smaller radius than the radius of said aperture whereby the contact between said base and aperture is at a single point, the pressure of said lever and knife edge causing said point of contact to remain on the same longitudinal line of the cylindrical aperture, and means for preventing said bearing element from moving longitudinally of the aperture in one direction.

10. A self-aligning bearing for a scale lever knife edge, comprising a substantially semi-circular bearing element having a V-shaped groove for receiving said knife edge, a member having a cylindrical aperture for receiving and supporting said element, the arc of the bearing element being formed on a smaller radius than that of said aperture whereby the element and aperture contact is located along a single longitudinal line of said aperture, the pressure of the knife edge and lever causing said contact to remain on said longitudinal line of the aperture, and means removably attached to said element for preventing its removal from said aperture.

11. A self-aligning bearing for a scale lever knife edge, comprising a substantially semi-circular bearing element provided with a V-shaped groove for receiving said knife edge, a member having a cylindrical concave surface on which said element rests, said element being formed on a smaller radius than the radius of said concave surface whereby the location of the contact between said element and said surface is along a single longitudinal line of said surface, the pressure of the knife edge and lever causing said contact to remain on said line.

12. A self-aligning bearing for a scale lever knife edge, comprising a bearing element provided with a V-shaped groove for supporting a knife edge, said bearing element having a conically shaped lower surface, and a member having a cylindrical concave surface on which said element rests, said surface being of larger radius than that of the base of said conical surface, whereby said surfaces contact each other at a single point located at the bottom of said concave surface, the weight of the knife edge and lever on the bearing element causing said point of contact to remain on the bottom of said concave surface and along the same longitudinal line of said latter surface.

13. In a weighing scale, a self alining bearing comprising a supporting member having a concavely curved surface, a knife edge pivot member freely universally movable relative to the supporting member and contacting said curved surface at only a single point to permit said universal movement, said knife edge pivot member tending by force of gravity to maintain said point of contact at the lowermost portion of the concave surface.

In testimony whereof I hereto affix my signature.

JAMES W. BRYCE.